US011166406B2

(12) United States Patent
Stanhope et al.

(10) Patent No.: US 11,166,406 B2
(45) Date of Patent: Nov. 9, 2021

(54) SOIL RESISTIVITY DETECTION SYSTEM FOR AN AGRICULTURAL IMPLEMENT

(71) Applicant: CNH Industrial America LLC, New Holland, PA (US)

(72) Inventors: Trevor Stanhope, Darien, IL (US); Darian Landolt, Evanston, IL (US); Jason Czapka, Munster, IN (US)

(73) Assignee: CNH Industrial America LLC, New Holland, PA (US)

( * ) Notice: Subject to any disclaimer, the term of this patent is extended or adjusted under 35 U.S.C. 154(b) by 404 days.

(21) Appl. No.: 16/225,500

(22) Filed: Dec. 19, 2018

(65) Prior Publication Data

US 2020/0196518 A1 Jun. 25, 2020

(51) Int. Cl.
| | |
|---|---|
| *A01C 7/20* | (2006.01) |
| *A01B 63/114* | (2006.01) |
| *A01B 79/02* | (2006.01) |
| *G01N 27/04* | (2006.01) |
| *G01V 3/15* | (2006.01) |
| *A01B 79/00* | (2006.01) |

(52) U.S. Cl.
CPC ............ *A01C 7/203* (2013.01); *A01B 63/114* (2013.01); *A01B 79/005* (2013.01); *A01B 79/02* (2013.01); *G01N 27/043* (2013.01); *G01V 3/15* (2013.01)

(58) Field of Classification Search
CPC ..... A01C 7/203; A01B 63/114; A01B 79/005; A01B 79/02; G01N 27/043; G01V 3/15
See application file for complete search history.

(56) References Cited

U.S. PATENT DOCUMENTS

| | | | |
|---|---|---|---|
| 3,026,829 A | 3/1962 | Lampkin | |
| 3,543,860 A | 12/1970 | Field | |
| 5,033,397 A * | 7/1991 | Colburn, Jr. ........ | A01M 7/0089 111/118 |
| 5,524,560 A * | 6/1996 | Carter ................... | A01C 7/203 111/200 |
| 5,841,282 A * | 11/1998 | Christy ................ | A01B 79/005 324/347 |
| 6,116,172 A | 9/2000 | Prairie et al. | |
| 6,386,128 B1 | 5/2002 | Svoboda et al. | |
| 6,484,652 B1 * | 11/2002 | Colburn, Jr. ......... | A01B 79/005 111/118 |
| 8,204,689 B2 | 6/2012 | Christy et al. | |

(Continued)

FOREIGN PATENT DOCUMENTS

WO 2017197292 A1 11/2017

*Primary Examiner* — Jamie L McGowan
(74) *Attorney, Agent, or Firm* — Rebecca L. Henkel; Rickard K. DeMille

(57) ABSTRACT

A soil resistivity detection system for an agricultural implement includes a row unit having row unit components. The row unit components include a residue management system configured to condition soil at a leading edge of the row unit, an opening system configured to form a furrow in the soil, a closing assembly configured to close the furrow, and a press wheel assembly configured to compact the soil. The soil resistivity detection system also includes a control assembly configured to output an electrical current to a first pair of the row unit components, receive voltages from a second pair of the row unit components, determine a voltage differential based on the voltages, and determine a soil resistivity based on the voltage differential.

20 Claims, 6 Drawing Sheets

(56) References Cited

U.S. PATENT DOCUMENTS

| | | | |
|---|---|---|---|
| 9,167,742 B2 * | 10/2015 | Masten | A01B 49/06 |
| 9,743,574 B1 * | 8/2017 | Maxton | A01C 21/007 |
| 9,864,094 B2 | 1/2018 | Stoller et al. | |
| 2013/0112122 A1 * | 5/2013 | Blomme | A01B 63/008 |
| | | | 111/149 |
| 2015/0305227 A1 | 10/2015 | Zemenchik et al. | |
| 2016/0037709 A1 | 2/2016 | Sauder et al. | |
| 2017/0049044 A1 * | 2/2017 | Stoller | A01C 23/025 |
| 2017/0067869 A1 * | 3/2017 | Lund | G01N 33/246 |
| 2017/0105335 A1 | 4/2017 | Xu et al. | |
| 2018/0168094 A1 * | 6/2018 | Koch | A01C 7/203 |
| 2018/0239044 A1 * | 8/2018 | Rhodes | G01N 27/223 |
| 2019/0075710 A1 * | 3/2019 | Strnad | A01C 5/064 |

* cited by examiner

SOIL RESISTIVITY DETECTION SYSTEM FOR AN AGRICULTURAL IMPLEMENT

BACKGROUND

The present disclosure relates generally to a soil resistivity detection system for an agricultural implement.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding and planting implements are towed behind a work vehicle, such as a tractor. Such implements generally contain a particulate material, such as seeds, fertilizer, and/or other agricultural product, which is distributed on or in the ground using various methods. After the particulate material is distributed, certain soil properties may affect an ability of the seeds to grow into a harvestable product. For example, such soil properties may include moisture content, salinity, soil type, temperature, and other soil properties. As such, a lack of knowledge regarding these soil properties during seeding or planting operations may negatively influence crop yields.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a soil resistivity detection system for an agricultural implement includes a row unit having row unit components. The row unit components include a residue management system configured to condition soil at a leading edge of the row unit, an opening system configured to form a furrow in the soil, a closing assembly configured to close the furrow, and a press wheel assembly configured to compact the soil. The soil resistivity detection system also includes a control assembly configured to output an electrical current to a first pair of the row unit components, receive voltages from a second pair of the row unit components, determine a voltage differential based on the voltages, and determine a soil resistivity based on the voltage differential.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
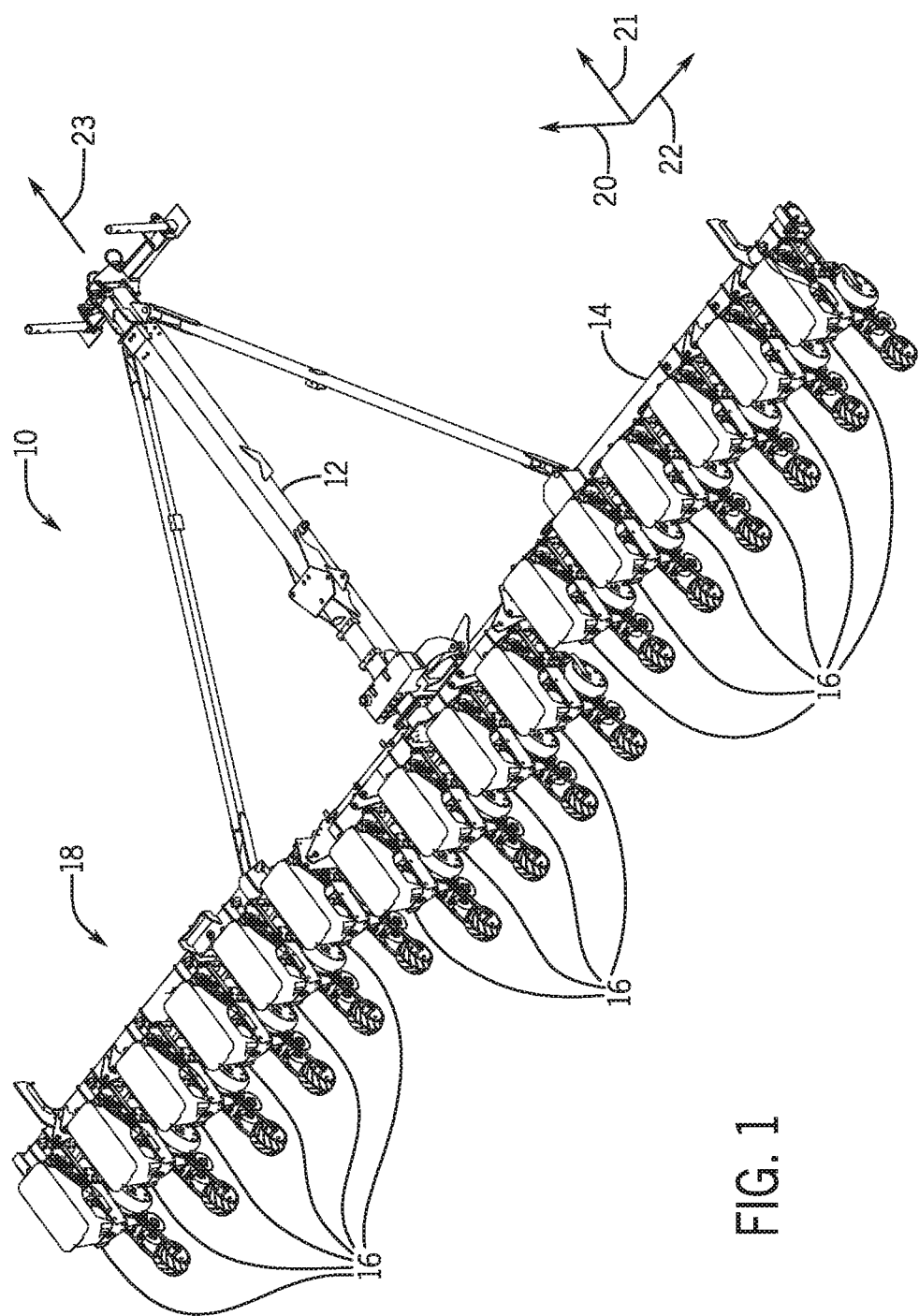
FIG. 1 is a perspective view of an embodiment of an agricultural implement having a soil resistivity detection system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a soil resistivity detection system for an agricultural system. Certain agricultural systems (e.g., air carts, implements, etc.) contain a particulate material (e.g., seeds, fertilizer, and/or other agricultural products). Certain agricultural systems are coupled to a respective implement and/or include tools (e.g., row units) that distribute the particulate material within a field. After the particulate material is distributed, certain soil properties may affect an ability of the seeds to grow into a harvestable product. For example, such soil properties may include moisture content, salinity, soil type, temperature, and other soil properties. These soil properties, among others, may be determined by a soil resistivity detection system based on an electrical resistivity of the soil.

Accordingly, in certain embodiments, a soil resistivity detection system may include row unit components of a row unit of the implement (e.g., a residue management system configured to condition soil at a leading edge of the row unit, an opening system configured to form a furrow in the soil, a closing assembly configured to close the furrow, a press wheel assembly configured to compact the soil, or a combination thereof). In certain embodiments, the soil resistivity detection system includes a control assembly with a controller having a memory and a processor. The controller is configured to output an electrical current to a first pair of the row unit components and to receive voltages via a second pair of the row unit components. The received voltages are indicative of a resistivity of the soil. The first pair of row unit components is different from the second pair of row unit components (i.e., there are no common components between the pairs). As such, the soil resistivity detection system may utilize functioning components of the row unit (e.g., the residue management system, the opening system, the closing assembly, and the press wheel assembly) as electrodes that flow a current through the soil and receive voltages from the soil. The soil resistivity detection system does not require adding non-functional components to the row unit to serve as electrodes.

In certain embodiments, the soil resistivity detection system includes lateral, soil engaging components of the row unit (e.g., first and second pairs of soil engaging electrodes). The first pair of soil engaging electrodes includes first and second soil engaging electrodes and the second pair of soil engaging electrodes includes third and fourth soil engaging electrodes. The second pair of soil engaging electrodes may be disposed generally between the first and second soil engaging electrodes along a lateral axis of the row unit. The first and second pairs of soil engaging electrodes may be a pair of residue discs of the residue management system, a pair of opening discs of the opening system, a pair of closing discs of the closing assembly, or a pair of fertilizer applicators. As described herein, the fertilizer applicators may include fertilizer tubes, fertilizer knives, fertilizer coulters, other components configured to apply fertilizer within soil, or a combination thereof. However, the soil engaging electrodes of the first pair do not include soil engaging electrodes of the second pair. For example, the first pair of soil engaging electrodes may include the pair of closing discs, and the second pair of soil engaging electrodes may include the pair of fertilizer applicators disposed generally between the pair of closing discs. The control assembly of the soil resistivity detection system may output a current to the first pair of soil engaging electrodes. The controller may receive first and second voltages via the second pair of soil engaging electrodes. Based on the first and second voltages, the controller may determine a voltage differential, and based on the determined voltage differential, the controller may determine the soil resistivity. As such, the first and second pairs of soil engaging electrodes may be electrodes that flow a current through the soil and receive first and second voltages, respectively.

With the foregoing in mind, the present embodiments relating to soil resistivity detection systems may be utilized within any suitable agricultural system. For example, FIG. 1 is a perspective view of an embodiment of an agricultural implement 10 (e.g., a planter) having a soil resistivity detection system 18. To facilitate discussion, the implement 10 and certain components of the implement 10 may be described with reference to a vertical axis or direction 20, a longitudinal axis or direction 21, and a lateral axis or direction 22. The implement 10 may be towed behind a work vehicle (e.g., a tractor) in a direction 23 generally along the longitudinal axis 21. The implement 10 includes a tongue assembly 12, which is shown in the form of an A-frame hitch assembly. The tongue assembly 12 may include a hitch used to attach to an appropriate vehicle hitch via a ball, clevis, or other coupling. For example, a tongue of the implement 10 may be connected to a drawbar of the work vehicle, or a mast of the implement may be connected to a 3-point hitch of the work vehicle. The tongue assembly 12 is coupled to a tool bar 14 which supports multiple row units 16.

Each row unit 16 includes a residue management system, an opening system, and a closing system. The closing system includes a closing assembly (i.e., one closing disc, two closing discs, etc.) and a press device (e.g., a press wheel assembly). In certain embodiments, each row unit 16 may include fertilizer applicators (e.g., tubes, knives, coulters, etc.). The implement 10 also includes the soil resistivity detection system 18. The soil resistivity detection system 18 may include the residue management system, the opening system, the closing assembly, the press wheel assembly, the fertilizer applicators, or a combination thereof, of at least one row unit 16. As described herein, the soil resistivity detection system 18 may determine a soil resistivity by utilizing one or more of the residue management system, the opening system, the closing disc(s), the press wheel assembly, and the fertilizer applicators as electrodes that provide a current to and/or receive voltages from the soil. As such, the soil resistivity detection system 18 may utilize functioning components of the row units 16 as electrodes. A control assembly of the soil resistivity detection system may determine certain soil properties based on the received voltages.

Figure 2:
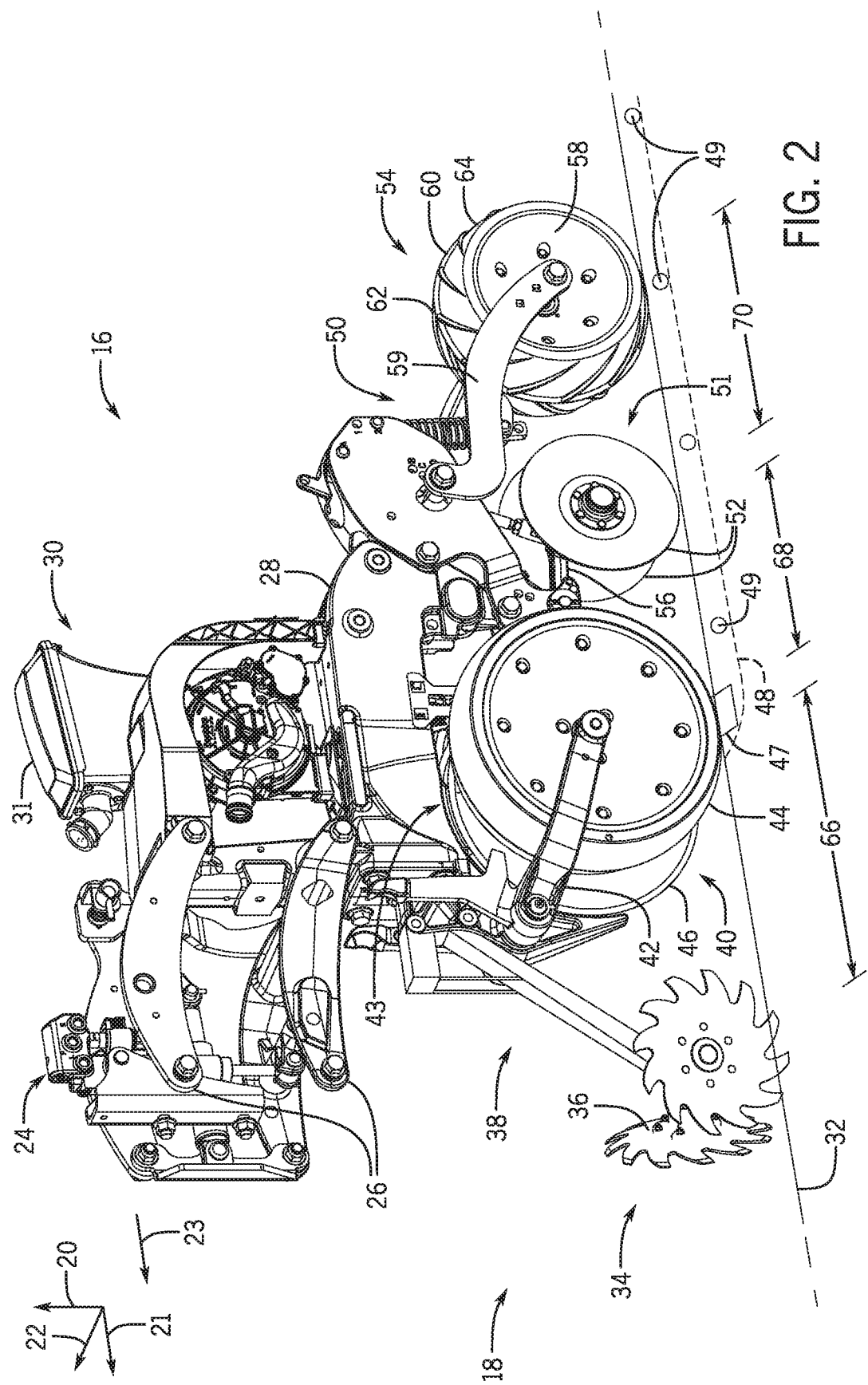
FIG. 2 is a perspective view of an embodiment of a row unit that may be employed in the agricultural implement of FIG. 1.

FIG. 2 is a perspective view of an embodiment of a row unit 16 that may be employed in the agricultural implement of FIG. 1. The soil resistivity detection system 18 may use portions of the row unit 16 to detect the soil resistivity. As illustrated, the row unit 16 includes a mounting assembly 24. The mounting assembly 24 includes linkages 26 that couple the row unit 16 to the tool bar of the implement. In the illustrated embodiment, the linkages 26 couple a chassis 28 of the row unit 16 to the tool bar of the implement. As the implement travels in the direction 23 and across various surfaces, the linkages 26 enable the chassis 28 and row unit components coupled to the chassis 28 to move generally along the vertical axis 20.

As illustrated, the chassis 28 is coupled to a seed delivery system 30. The seed delivery system 30 stores seeds 49 and delivers the seeds 49 to soil 32. The seed delivery system 30 may include a hopper 31, a seed meter, a motor, a seed delivery tube, other components of the row unit 16, or a combination thereof. For example, the hopper 31 may store the seeds 49, the seed meter may regulate the deposition of the seeds 49 and may be driven by the motor, and the seed delivery tube may provide a pathway to deliver the seeds 49 to the soil 32.

In certain embodiments, the row unit 16 may include systems that provide other agricultural products in addition to, or instead of, the seeds 49. For example, the row unit 16 may include a fertilizer system that delivers a fertilizer to the soil 32. The fertilizer system may include fertilizer applicator(s) (e.g., fertilizer tube(s), fertilizer knive(s), fertilizer coulter(s), etc.) that deliver the fertilizer at certain portion(s) of the row unit 16. The fertilizer may include nutrients and/or other components that enhance a seed's ability to mature into a harvestable product.

The row unit 16 includes various row unit components that enable the row unit 16 to form a furrow 48 in the soil 32 and to close the furrow 48 after deposition of the seed 49. As illustrated, the furrow forming and closing components of the row unit 16 include a residue management system 34, an opening system 40, a closing assembly 51, and a press wheel assembly 54. The closing assembly 51 and the press wheel assembly 54 form a closing system 50 of the row unit 16.

The residue management system 34 includes residue discs 36 that break up/move residue (e.g., plant stalks, clods, debris, etc.) at a leading edge of the row unit 16. The residue discs 36 are coupled to the chassis 28 by arms 38. While the illustrated embodiment includes two residue discs 36, other embodiments may include more or fewer residue discs (e.g., one residue disc, three residue discs, four residue discs, etc.). As the row unit 16 travels across the soil 32, the residue discs 36 rotate and engage the soil 32 in a manner that enhances the ability of the opening system 40 in creating the furrow 48. For example, the residue discs 36 may break apart clods of the soil 32, move debris out of a pathway of the row unit 16, level the soil 32, bury residue, or a combination thereof. For example, the residue discs 36 engage and penetrate the soil 32 to cut and/or bury the residue. In certain embodiments, the residue management system 34 may include other mechanisms in addition to or instead of the residue discs 36 that engage the soil 32 and cut/bury/move the residue. The residue discs 36 include conductive material that may serve as an electrode of the soil resistivity detection system 18.

The opening system 40 includes gauge wheels 44 and opening discs 46 that form the furrow 48 in the soil 32. The gauge wheels 44 are coupled to the chassis 28 by arms 42. The opening discs 46 are coupled to the chassis 28 by an arm assembly 43 (e.g., an arm assembly between the two opening discs 46). While the illustrated embodiment includes two gauge wheels 44 and two opening discs 46, other embodiments may include more or fewer gauge wheels and/or opening discs. Each gauge wheel 44 enables the respective opening disc 46 to accurately form the furrow 48 in the soil 32 at a target depth. For example, as the gauge wheel 44 rides along a surface of the soil 32, the respective opening disc 46 penetrates the soil 32 at the target depth to form the furrow 48. As illustrated, one gauge wheel 44 and one opening disc 46 are disposed on either lateral side of the furrow 48. As such, a first opening disc 46 may form a first lateral side of the furrow 48, and a second opening disc 46 may form a second lateral side of the furrow 48.

As illustrated, the opening system 40 also includes a furrow forming point 47 that forms and/or further defines the furrow 48 by penetrating the soil 32. As illustrated, the furrow forming point 47 is disposed generally between and behind the leading edges of the opening discs 46. After the opening discs 46 begin to form the furrow 48 in the soil 32, the furrow forming point 47 may further define the furrow 48. For example, the furrow forming point 47 may penetrate the soil 32 to define the sides and a bottom of the furrow 48. The definition of the furrow 48 established by the furrow forming point 47 may enable the row unit 16 to more uniformly and precisely deposit the seeds 49 in the soil 32 at a target depth and/or may enable to the closing system 50 to more precisely and uniformly close the furrow 48 after deposition of the seeds 49. The gauge wheels 44, the opening discs 46, the furrow forming point 47, or a combination thereof, may include conductive material that serves as electrode(s) of the soil resistivity detection system 18. In certain embodiments, the opening system 40 may include a seed shoe and/or a firming point in addition to, or instead of, the furrow forming point 47. The seed shoe and/or the firming point may also form and/or further define the furrow 48 in the soil. The seed shoe and/or the firming point may include conductive material that serves as electrode(s) of the soil resistivity detection system 18.

As illustrated, the closing system 50 includes the closing assembly 51 and the press wheel assembly 54 that close the furrow 48. In certain embodiments, the closing system 50 may include other mechanisms in addition to or instead of the closing assembly 51 and the press wheel assembly 54 that engage the soil and close the furrow 48. The closing assembly 51 includes closing discs 52 that engage and/or penetrate the soil 32. While the illustrated embodiment includes two closing discs 52, certain embodiments may include more or fewer closing discs (e.g., one closing disc, three closing discs, four closing discs, etc.). The closing discs 52 are coupled to the chassis 28 by an arm 56. As the row unit 16 travels along the longitudinal axis 21, the closing discs 52 push the soil 32 (e.g., the soil 32 displaced by the opening system 40) toward the furrow 48 and on top of the seeds 49. For example, a first closing disc 52 on a first lateral side of the furrow 48 may push the soil 32 on the first lateral side into the furrow 48, and a second closing disc 52 on a second lateral side of the furrow 48 may push the soil 32 on the second lateral side into the furrow 48. As such, the closing discs 52 close the furrow 48. The closing discs 52 include conductive material that may serve as an electrode of the soil resistivity detection system 18.

As illustrated, the press wheel assembly 54 includes a press wheel 58 that compacts and/or closes the furrow 48. In certain embodiments, the row unit 16 may include other row unit components in addition to and/or instead of the press wheel assembly 54 that compact and/or close the furrow 48. As illustrated, the press wheel assembly 54 includes arms 59 that couple the press wheel 58 to the chassis 28. The press wheel 58 includes a middle portion 60, a first insulative portion 62, and a second insulative portion 64. The middle portion 60 may be a conductive strip that supplies a current to and/or receives a voltage from the soil 32 (e.g., serves as an electrode of the soil resistivity detection system 18). The first insulative portion 62 and the second insulative portion 64 may include insulative materials. In certain embodiments, the entire press wheel may be conductive such that the entire press wheel serves as an electrode of the soil resistivity detection system 18.

In some embodiments, the press wheel may include a first conductive portion and a second conductive portion along outer portions of the press wheel, and a third conductive portion and a fourth conductive portion along inner portions of the press wheel. The first conductive portion, the second conductive portion, the third conductive portion, and the fourth conductive portion may be spaced generally equally along the lateral axis 22 and may be separated by insulative portions. As such, the first conductive portion, the second conductive portion, the third conductive portion, and the fourth conductive portion may be lateral components of the press wheel and of the row unit. Additionally, the first and second conductive portions may serve as first and second electrodes of the soil resistivity detection system, and the third and fourth conductive portions may serve as third and fourth electrodes of the soil resistivity detection system.

The soil resistivity detection system 18 may utilize certain row unit components (e.g., the residue management system 34, the opening system 40, the closing assembly 51, and the press wheel assembly 54) and/or portion(s) of certain row unit components as electrodes to determine a resistivity of the soil 32. For example, each of the row unit components may include a conductive material that supplies a current to and/or receives a voltage from the soil 32. In certain embodiments, the array of electrodes of the soil resistivity detection system may include row unit components of multiple and/or separate row units. Additionally or alternatively, in some embodiments, an electrode may be added to a row unit component to enable the row unit component to serve as an electrode of the soil resistivity detection system 18. For example, a row unit component may not usually include conductive material that could serve as the electrode. An electrode that includes conductive material may be added to the row unit component such that the row unit component includes the electrode.

The soil resistivity detection system 18 may include a control assembly that includes controller(s), a power source, an electrical harness, sensor(s), or a combination thereof. The controller may instruct the electrical harness and/or the power source to supply an electrical current to a first pair of the row unit components. The first pair may include any two of the residue management system 34, the opening system 40, the closing assembly 51, and the press wheel assembly 54. The current may flow from a first row unit component of the first pair to a second row unit component of the first pair. The controller may receive voltages via a second pair of the row unit components (e.g., which may be electrically connected to the controller via the electrical harness). For example, the controller may receive a first voltage via a first row unit component of the second pair (e.g., a third row unit component) and a second voltage via a second row unit component of the second pair (e.g., a fourth row unit component). In certain embodiments, a first sensor disposed at the first row unit component and/or a second sensor disposed at the second row unit component of the second pair may detect the respective voltages and may output sensor signals indicative of the voltages to the controller (e.g., the first and second sensors may be communicatively coupled to the controller). Based on the first and second voltages, the controller may determine a voltage differential. Further, based on the voltage differential, among other factors, the controller may determine a resistivity of the soil 32. Still further, based on the resistivity of the soil, the controller may determine certain soil properties, such as moisture content, salinity, soil type, temperature, other soil properties, or a combination thereof.

As illustrated, the row unit components are spaced at particular intervals along the row unit 16 (e.g., at particular spacings along the longitudinal axis 21). The residue management system 34 and the opening system 40 are separated by a first spacing 66. The opening system 40 and the closing assembly 51 are separated by a second spacing 68. The closing assembly 51 and the press wheel assembly 54 are separated by a third spacing 70. In certain embodiments, each of the first spacing 66, the second spacing 68, and the third spacing 70 may be generally equal (e.g., within one inch) to one another. In other embodiments, two spacings of the first spacing 66, the second spacing 68, and the third spacing 70 may be generally equal (e.g., the first spacing 66 may be generally equal to the third spacing 70 (within one inch of one another) and different from the second spacing 68). In some embodiments, each of the first spacing 66, the second spacing 68, and the third spacing 70 may be different from one another. In certain embodiments, the spacing between each row unit component may be adjusted by a user of the implement and/or automatically adjusted by a controller of the implement.

The controller may determine a soil resistivity based in part of the spacing between row unit components. For example, the controller may determine how much current to supply to the soil 32 based in part on a spacing between the first row unit component and the second row unit component of the first pair of row unit components. The spacing may affect how far and the extent to which the supplied current penetrates the soil 32. The controller may also determine the soil resistivity based in part on a spacing between the first row unit component and second row unit component of the second pair of row unit components. In certain embodiments, an increased spacing between the first row unit component and the second row unit component of the second pair may enable the controller to determine the soil resistivity at an increased depth of the soil.

In certain embodiments, the first row unit component of the first pair of row unit components may be the press wheel assembly 54. The second row unit component of the first pair may be the residue management system 34. The controller may supply a current via the electrical harness and/or the power source (e.g., the controller may instruct the power source to supply the current) to the press wheel assembly 54 which may flow to the residue management system 34 (e.g., the press wheel assembly 54 and the residue management system 34 may supply the electrical current to the soil 32). For example, the middle portion 60 of the press wheel assembly 54 may serve as a first electrode to supply the current to the soil 32. One or more of the residue discs 36 may serve as a second electrode to receive the current. In some embodiments, the controller may also supply the current to the residue management system 34 which may flow to the press wheel assembly 54 (e.g., the residue management system 34 may serve as the first electrode of the first pair, and the press wheel assembly 54 may serve as the second electrode of the first pair).

The first row unit component of the second pair of row unit components (e.g., the third row unit component) may be the opening system 40. The second row unit component of the second pair (e.g., the fourth row unit component) may be the closing assembly 51. The controller may receive voltages via the opening system 40 and the closing assembly 51. For example, one or more opening discs 46 or the furrow forming point 47 may serve as a third electrode to receive a first voltage from the soil 32. One or more closing discs 52 of the closing assembly 51 may serve as a fourth electrode to receive a second voltage from the soil 32. As described above, in certain embodiments, sensor(s) may be disposed at the third and fourth electrodes and may output sensor signals indicative of the respective voltages to the controller. Based on the first and second received voltages, the controller may determine a voltage differential. Based on the voltage differential, the controller may determine the soil resistivity. The controller may determine the soil resistivity based in part on the respective spacings between of the residue management system 34, the opening system 40, the closing assembly 51, and the press wheel assembly 54.

In certain embodiments, the first pair of row unit components may include row unit components other than the press wheel assembly 54 and the residue management system 34. Additionally, the second pair of row unit components may include row unit components other than the opening system 40 and the closing assembly 51. However, the first pair of row unit components does not include row unit component(s) included in the second pair of row unit components. As such, any of the residue management system 34, the opening system 40, the closing assembly 51, and the press wheel assembly 54 may be utilized by the control assembly to supply a current to the soil 32 or receive a voltage from the soil 32.

Figure 3:
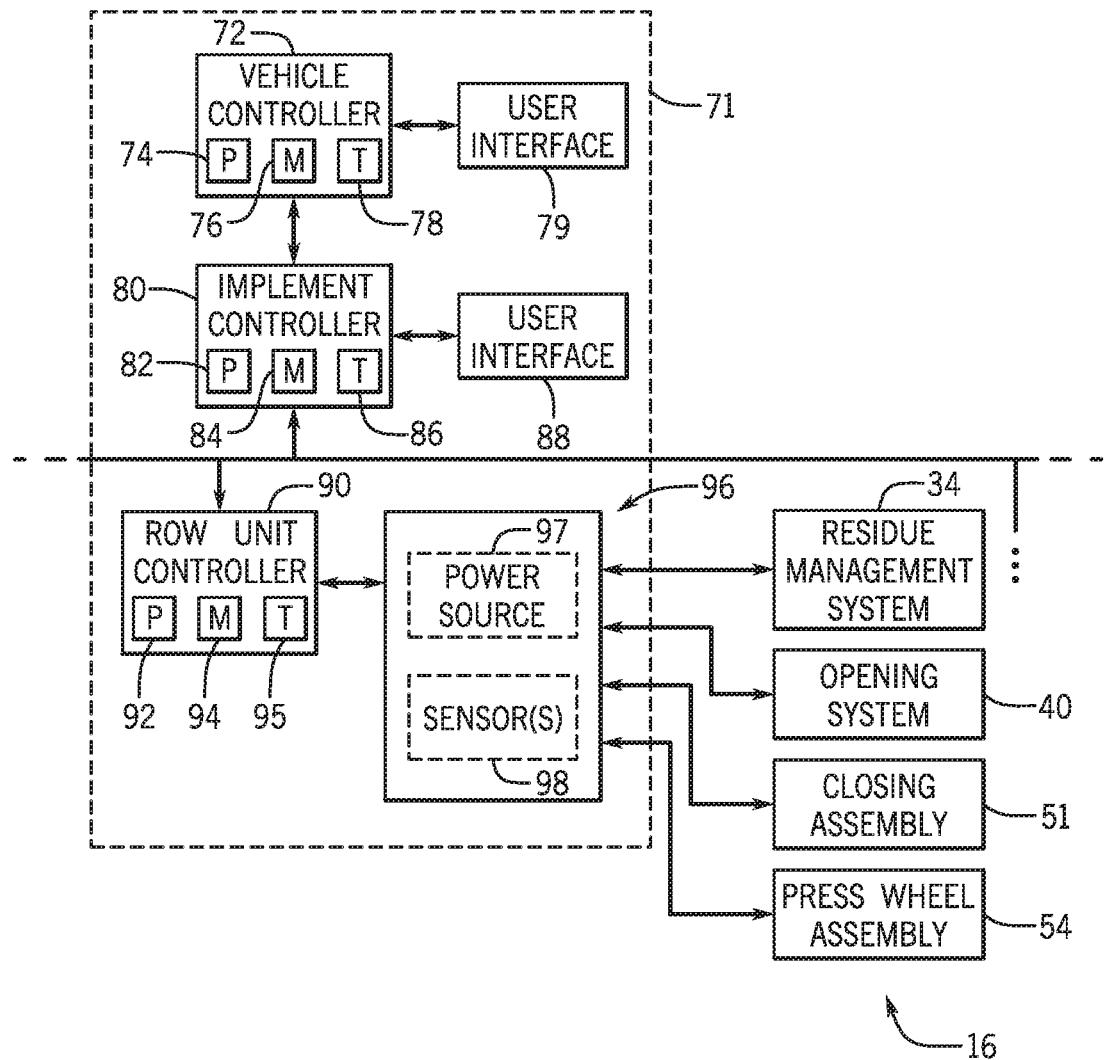
FIGS. 3 and 4 are schematic diagrams of embodiments of soil resistivity detection systems that may be employed in the agricultural implement of FIG. 1.

FIG. 3 is a schematic diagram of an embodiment of a soil resistivity detection system 18 that may be employed in the agricultural implement of FIG. 1. The soil resistivity detection system 18 includes a control assembly 71. The control assembly 71 is configured to output the electrical current to the first pair of row unit components and receive voltages from the second pair of row unit components. As illustrated, the control assembly 71 includes a vehicle controller 72, an implement controller 80, and a row unit controller 90. In certain embodiments, the control assembly 71 may include more or fewer controllers. For example, the vehicle controller 72, the implement controller 80, the row unit controller 90, or a combination thereof, may be omitted. The vehicle controller 72 may be disposed on the work vehicle or remotely from the work vehicle, and the implement controller 80 may be disposed on the agricultural implement or remotely from the agricultural implement. As illustrated, the control assembly 71 also includes a user interface 79 and a user interface 88. The user interface 79 may enable a user positioned in the cab or remotely from the cab to interact with and/or control the soil resistivity detection system 18 via the vehicle controller 72. The user interface 88 may be disposed on the implement or remotely from the implement and may enable a user to interact with and/or control the soil resistivity detection system 18 via the implement controller 80. For example, the user interface 79 and/or user interface 88 may display selectable options of the soil resistivity detection system 18 and/or present values determined by the soil resistivity detection system 18, such as received voltages, a determined voltage differential, a determined soil resistivity, soil properties related to the soil resistivity, and other values related to operation of the work vehicle and/or the agricultural implement.

As illustrated, the vehicle controller 72 is communicatively coupled to the implement controller 80, and the implement controller 80 is communicatively coupled to the row unit controller 90. In certain embodiments, the soil resistivity detection system 18 may include additional row unit controllers 90 communicatively coupled to the implement controller 80. Each row unit controller 90 may control an individual row unit 16 or a group of row units 16. In some embodiments, the vehicle controller 72 may be directly and communicatively coupled to the row unit controller 90. As illustrated, the row unit controller 90 is communicatively coupled to an electrical harness 96. The electrical harness 96 is communicatively and/or electrically coupled to each row unit component (e.g., the residue management system 34, the opening system 40, the closing assembly 51, and the press wheel assembly 54) of the row unit 16. In certain embodiments, the control assembly 71 may include a power source 97 and/or sensor(s) 98 electrically coupled to the electrical harness 96. The controller of the control assembly 71 may output control signals to the power source 97 indicative of instructions to supply the electrical current via the electrical harness 96 to the first pair of row unit components. Additionally, the sensor(s) 98 may receive/determine the voltages at the second pair of row unit components. In certain embodiments, the electrical harness 96 may be directly electrically coupled to the row unit components and/or the respective portions of the row unit components serving as electrodes.

Each controller includes a processor (e.g., processor 74, processor 82, and processor 92) and a memory (e.g., memory 76, memory 84, and memory 94). In some embodiments, each memory may include one or more tangible, non-transitory, computer-readable media that store instructions executable by the corresponding microprocessor and/or data to be processed by the corresponding microprocessor. For example, the memory 76 may store instructions executable by the processor 74, and the microprocessor 74 may be configured to execute the instructions stored by the memory 76. Each memory may include random access memory (RAM), read-only memory (ROM), rewritable non-volatile memory (e.g., flash memory), hard drive(s), optical disc(s), or a combination thereof. The processors/microprocessors may include general-purpose microprocessors, one or more application specific integrated circuits (ASICs), one or more field programmable logic arrays (FPGAs), or a combination thereof.

In certain embodiments, the controllers of the control assembly 71 and/or other portions of the soil resistivity detection system 18 may be communicatively coupled via a wired connection (e.g., Ethernet, universal serial bus (USB), CANbus, ISObus, etc.). Additionally, as illustrated, each controller includes a transceiver (e.g., transceiver 78, transceiver 86, transceiver 95) that enables wireless and/or remote communication between each controller and/or with the user positioned remotely from the control assembly 71. The wireless communication may be via a wireless connection (e.g., Wi-Fi, Bluetooth, etc.).

Any controller of the vehicle controller 72, the implement controller 80, and the row unit controller 90 may output signals to the electrical harness 96 and/or to the power source 97 to cause certain row unit components of the row unit 16 to supply a current to the soil (e.g., to cause the power source 97 to supply the electrical current via the electrical harness 96). For example, a user may provide an input to the user interface 79 or the user interface 88 indicative of a request determine the soil resistivity and/or soil properties at the row unit 16. In response, the vehicle controller 72 or the implement controller 80, via a respective processor, may output a signal to the row unit controller 90 indicative of the request. The row unit controller 90 may output signal(s) to the electrical harness 96 and/or the power source 97 indicative of instructions to supply the current to the first pair of row unit components. In certain embodiments, the vehicle controller 72 may output the signal indicative of the request to supply the current to the implement controller 80, which may be relayed to the row unit controller 90. In some embodiments, the vehicle controller 72 and/or the implement controller 80 may output signal(s) directly to the electrical harness 96 to cause the electrical harness 96 to supply the current and/or to receive the voltages.

In certain embodiments, a controller (e.g., the vehicle controller 72, the implement controller 80, or the row unit controller 90) may automatically determine the soil resistivity and the soil properties automatically and independent of a user input. For example, the controller may automatically determine the soil resistivity and the soil properties at periodic intervals (i.e., every minute, every ten minutes, etc.) and/or based upon a triggering event. Triggering events may include movement of the implement into a new field, movement to a new row in the field, movement to a selected portion of the field, movement to a different type of terrain, attachment of the implement to the work vehicle, starting and/or stopping of seed deposition, other events, or a combination thereof.

A controller (e.g., the vehicle controller 72, the implement controller 80, the row unit controller 90) of the soil resistivity detection system 18 may output a signal or set of signals to the power source 97 to cause the power source 97 to supply a current to certain row unit components (e.g., the residue management system 34, the opening system 40, the closing assembly 51, the press wheel assembly 54, or a combination thereof). For example, the controller may output a first signal to supply the current to the first pair of row unit components (e.g., to the electrodes of the first pair of row unit components). In response, the power source 97, via the electrical harness 96, may supply the current such that the current flows from a first row unit component of the first pair to a second row unit component of the first pair. In certain embodiments, the controller and/or the electrical harness 96 may directly communicate with the first pair of row unit components such that the controller provides the current to the first pair of row unit components.

The controller may receive sensor signals from the sensors 98 indicative of the voltages (e.g., the first voltage and the second voltage) received by the first row unit component of the second pair (e.g., the third row unit component) and the second row unit component of the second pair (e.g., the fourth row unit component). In certain embodiments, the electrical harness 96 may output signal(s) to the controller indicative of the first voltage and the second voltage. In certain embodiments, the controller may directly communicate with the second pair of row unit components such that the controller receives signals indicative of the first voltage and the second voltage from the row unit components (e.g., from the electrodes of the row unit components). The row unit components of the first pair are different than the row unit components of the second pair.

Based upon the first voltage and the second voltage received by the controller (e.g., first and second sensor signals indicative of the first and second voltages, respectively), the controller may determine a voltage differential. Based on the voltage differential and the respective spacing between each row unit component, the controller may determine a resistivity of the soil and properties determined by the resistivity. The controller may instruct the user interface (e.g., the user interface 79 and/or the user interface 88) to display one or more of the soil properties (e.g., as a soil property map) and/or output signal(s) indicative of the soil properties to other controller(s) for display on a respective user interface. For example, based upon received first and second voltages, the row unit controller 90 may determine the voltage differential, the soil resistivity, and the soil properties. The row unit controller 90 may output signal(s) indicative of the voltage differential, the soil resistivity, the soil properties, or a combination thereof, to the user interface 79 and/or the user interface 88 for display to the user. In certain embodiments, the vehicle controller 72 and/or the implement controller 80 may determine and instruct the respective user interface to display the voltage differential, the soil resistivity, the soil properties, or a combination thereof, based on the received first and second voltages. In certain embodiments, the functions of outputting the signal(s) to supply the current, receiving the voltages, determining the voltage differential, determining the soil resistivity, and determining the soil properties based on the soil resistivity may between split between controllers (e.g., the vehicle controller 72, the implement controller 80, the row unit controller 90, or a combination thereof) of the control assembly 71.

Figure 4:
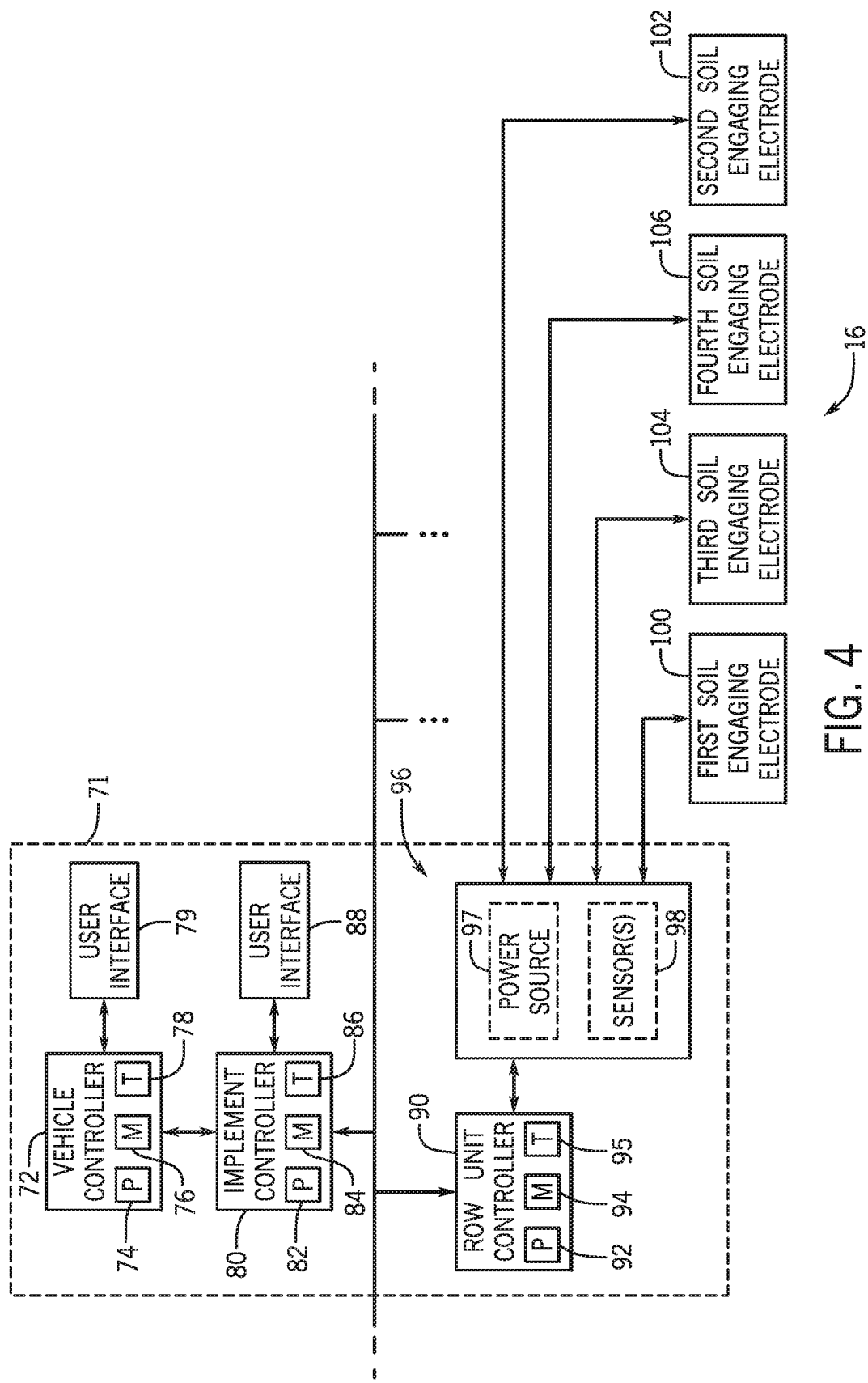

FIG. 4 is a schematic diagram of an embodiment of a soil resistivity detection system 18 that may be employed in the agricultural implement of FIG. 1. As illustrated, the soil resistivity detection system 18 includes a first soil engaging electrode 100, a second soil engaging electrode 102, a third soil engaging electrode 104, and a fourth soil engaging electrode 106. The first soil engaging electrode 100, the second soil engaging electrode 102, the third soil engaging electrode 104, and the fourth soil engaging electrode 106 are disposed laterally along a width of the row unit 16 and are lateral components of the row unit 16 (e.g., lateral row unit components) and the soil resistivity detection system 18. In certain embodiments, the first soil engaging electrode 100, the second soil engaging electrode 102, the third soil engaging electrode 104, and the fourth soil engaging electrode 106 may be spaced at particular intervals along the lateral axis (e.g., 1 inch, 1½ inches, 2 inches, 2½ inches, etc.). The spacings between the first soil engaging electrode 100, the second soil engaging electrode 102, the third soil engaging electrode 104, and the fourth soil engaging electrode 106 may be substantially equal to one another, or the spacings may be different from one another. For example, a spacing between the first soil engaging electrode 100 and the third soil engaging electrode 104 may be equal to a spacing between the fourth soil engaging electrode 106 and the second soil engaging electrode 102, but different than a spacing between the third soil engaging electrode 104 and the fourth soil engaging electrode 106. Based in part on the spacings between the first soil engaging electrode 100, the second soil engaging electrode 102, the third soil engaging electrode 104, and the fourth soil engaging electrode 106, the soil resistivity detection system 18 may determine the soil resistivity. A larger spacing between lateral components may enable detection of the soil resistivity and the associated soil properties at an increased depth of the soil.

In certain embodiments, the row unit 16 may include fertilizer applicator(s) (e.g., fertilizer tube(s), fertilizer knive(s), fertilizer coulter(s), etc.) that provide fertilizer to the soil. For example, the row unit 16 may include fertilizer applicator(s) disposed along a width of the row unit 16 (e.g., along the lateral axis). The soil resistivity detection system 18 may utilize the fertilizer applicator(s) and laterally-spaced row unit components (e.g., lateral components) as electrodes to supply the current to the soil and/or to receive the voltages from the soil.

The first soil engaging electrode 100 and the second soil engaging electrode 102 may include portion(s) of particular components of the row unit 16. For example, the first soil engaging electrode 100 and/or the second soil engaging electrode 102 may be the residue discs, the opening discs, the closing discs, or the fertilizer applicators. The third soil engaging electrode 104 and the fourth soil engaging electrode 106 may be the residue discs, the opening discs, the closing discs, or the fertilizer applicators. However, the first soil engaging electrode 100 and the second soil engaging electrode 102 do not include row unit components of the third soil engaging electrode 104 and the fourth soil engaging electrode 106. The third soil engaging electrode 104 and the fourth soil engaging electrode 106 may be disposed between the first soil engaging electrode 100 and the second soil engaging electrode 102 along the lateral axis (i.e., laterally between the residue discs, laterally between the opening discs, laterally between the closing discs, or laterally between the fertilizer applicators). As such, the soil resistivity detection system 18 may utilize the first soil engaging electrode 100, the second soil engaging electrode 102, the third soil engaging electrode 104, and the fourth soil engaging electrode 106 as electrodes in a laterally-spaced array to supply the current to the soil and receive the first and second voltages.

For example, as illustrated, the electrical harness 96 is communicatively and/or electrically coupled to the power source 97, the sensors 98, the first soil engaging electrode 100, the second soil engaging electrode 102, the third soil engaging electrode 104, and the fourth soil engaging electrode 106. A controller (e.g., the vehicle controller 72, the implement controller 80, the row unit controller 90) may output a signal or set of signals to the power source 97 to cause the power source 97 to supply the current to a first pair of lateral components (e.g., the first soil engaging electrode 100 and the second soil engaging electrode 102) via the electrical harness 96. In response, the power source 97 may supply the current such that the current flows from the first lateral component (e.g., the first soil engaging electrode 100) to the second lateral component (e.g., the second soil engaging electrode 102) of the first pair, or vice versa. In certain embodiments, the controller may directly communicate with the first and second lateral components of the first pair.

The controller may receive sensor signals from the sensors 98 indicative of the voltages (e.g., the first voltage and the second voltage) received by a first lateral component of a second pair of the lateral components (e.g., the third soil engaging electrode 104) and a second lateral component of the second pair of the lateral components (e.g., the fourth soil engaging electrode 106). In certain embodiments, the electrical harness 96 may output signal(s) to the controller indicative of the first voltage and the second voltage. In some embodiments, the controller may directly communicate with the second pair of lateral components such that the controller receives signals indicative of the first voltage and the second voltage directly from the second pair of lateral components. Based upon the first voltage and the second voltage received by the controller, the controller may determine a voltage differential (e.g., a difference in voltage between the first voltage and the second voltage). Based on the voltage differential and the respective spacing between the first soil engaging electrode 100, the second soil engaging electrode 102, the third soil engaging electrode 104, and the fourth soil engaging electrode 106, the controller may determine a resistivity of the soil.

Figure 5:
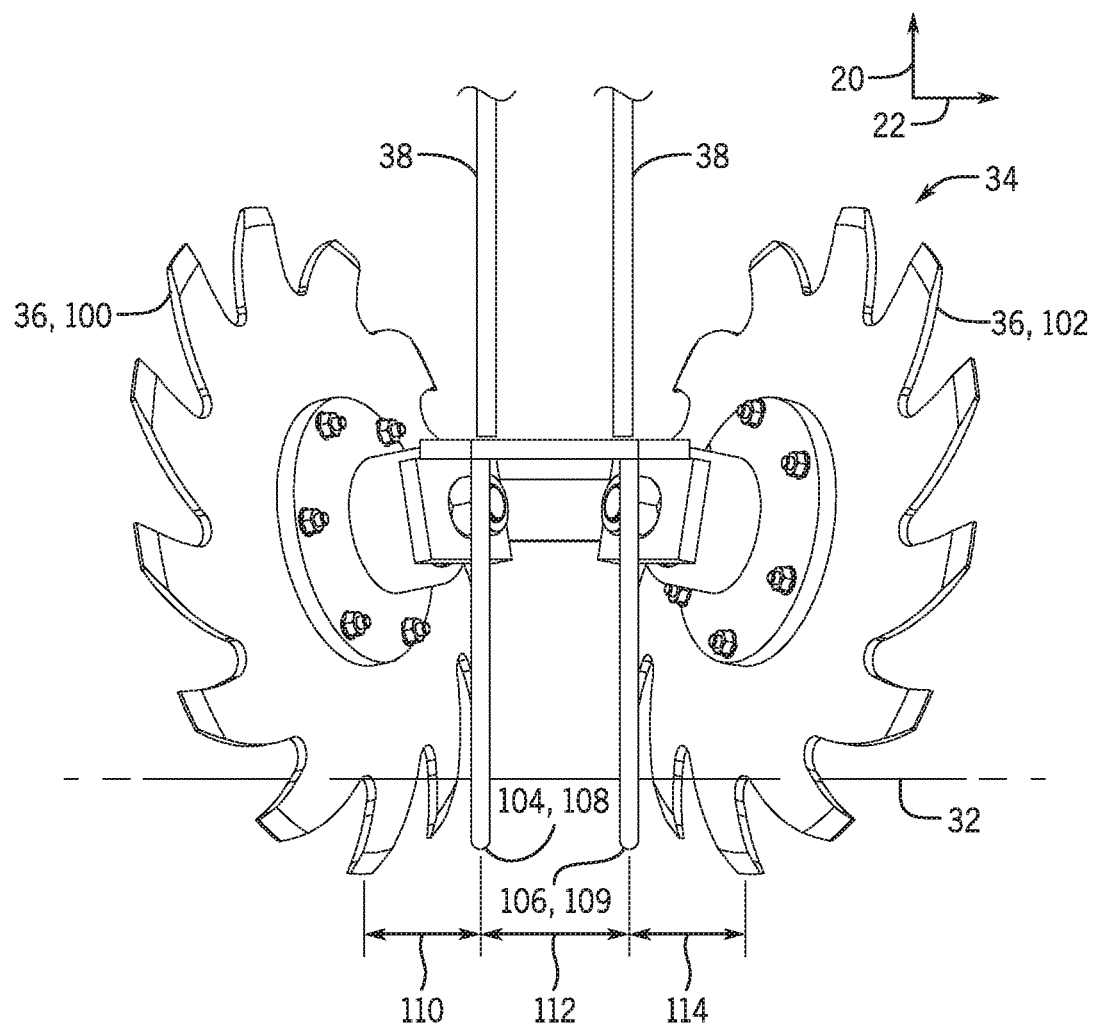
FIG. 5 is a back view of an embodiment of a residue management system that may be employed within the row unit of FIG. 2.

FIG. 5 is a back view of an embodiment of a residue management system 34 that may be employed within the row unit of FIG. 2. As illustrated, the residue management system 34 includes the residue discs 36 coupled to the chassis of the row unit by the arms 38. A first fertilizer applicator 108 and a second fertilizer applicator 109 are disposed generally between the residue discs 36 (e.g., between a first residue disc 36 and a second residue disc 36) along the lateral axis 22. The first fertilizer applicator 108 and the second fertilizer applicator 109 may include fertilizer tubes, fertilizer knives, fertilizer coulters, other components configured to apply fertilizer within soil, or a combination thereof. The first residue disc 36 and the first fertilizer applicator 108 are separated by a first lateral spacing 110, the first fertilizer applicator 108 and the second fertilizer applicator 109 are separated by a second lateral spacing 112, and the second fertilizer applicator 109 and the second residue disc 36 are separated by a third lateral spacing 114. In certain embodiments, the first lateral spacing 110, the second lateral spacing 112, and the third lateral spacing 114 may be substantially equal to one another. In some embodiments, two spacings of the first lateral spacing 110, the second lateral spacing 112, and the third lateral spacing 114 may be substantially equal to one another. Further, in other embodiments, the first lateral spacing 110, the second lateral spacing 112, and the third lateral spacing 114 may be different from one another. The first residue disc 36, the first fertilizer applicator 108, the second fertilizer applicator 109, and the second residue disc 36 may be disposed at selected spacings/intervals along the lateral axis 22 of the row unit and implement.

Each of the first residue disc 36, the first fertilizer applicator 108, the second fertilizer applicator 109, and the second residue disc 36 may penetrate the soil 32 and serve as an electrode of the soil resistivity detection system. As illustrated, the first and second residue discs 36 are the first soil engaging electrode 100 and the second soil engaging electrode 102, respectively. The first fertilizer applicator 108 and the second fertilizer applicator 109 are the third soil engaging electrode 104 and the fourth soil engaging electrode 106, respectively. As such, the first residue disc 36, the first fertilizer applicator 108, the second fertilizer applicator 109, and the second residue disc 36 may be lateral components serving as electrodes of the soil resistivity detection system 18.

For example, a controller may cause the power source to supply the current to the first pair of lateral components. The first pair of lateral components may include the first and second residue discs 36, the first residue disc 36 and the first fertilizer applicator 108, or another combination of the lateral components (e.g., another combination of the first residue disc 36, the first fertilizer applicator 108, the second fertilizer applicator 109, and the second residue disc 36). The controller may receive the first and second voltages from the second pair of lateral components or from the sensors of the control assembly that may be coupled to the second pair of lateral components. The second pair of lateral components may include the first fertilizer applicator 108 and the second fertilizer applicator 109, the second fertilizer applicator 109 and the second residue disc 36, or another combination of the lateral components. However, the first pair of lateral components do not include components of the second pair of lateral components. Based on the received first and second voltages, the controller may determine a voltage differential. Based on the voltage differential and the respective spacing between the first soil engaging electrode 100 (e.g., the first residue disc 36), the second soil engaging electrode 102 (e.g., the second residue disc 36), the third soil engaging electrode 104 (e.g., the first fertilizer applicator 108), and the fourth soil engaging electrode 106 (e.g., the second fertilizer applicator 109), the controller may determine a resistivity of the soil.

Figure 6:
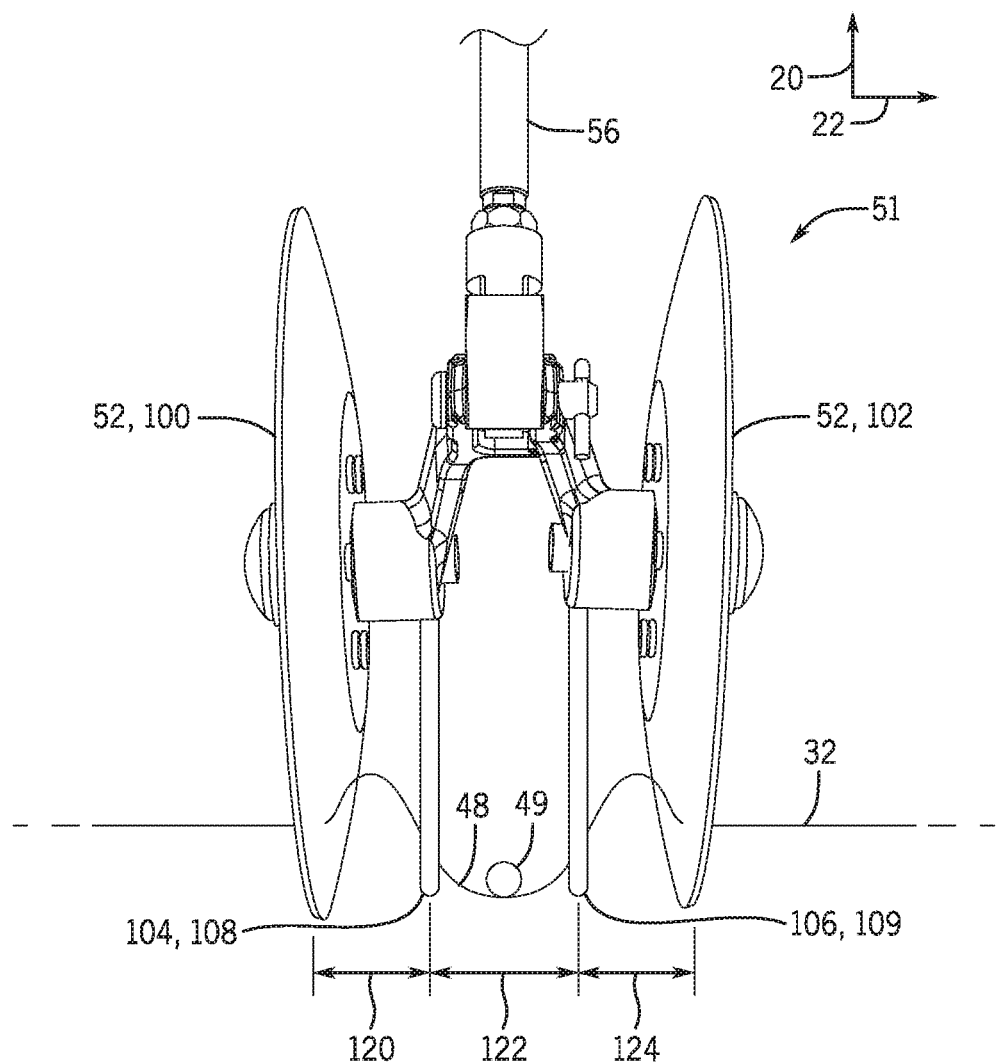
FIG. 6 is a front view of an embodiment of a closing assembly that may be employed within the row unit of FIG. 2.

FIG. 6 is a front view of an embodiment of a closing assembly 51 that may be employed within the row unit of FIG. 2. As illustrated, the closing assembly 51 includes the closing discs 52 coupled to the chassis of the row unit by the arm 56. The first fertilizer applicator 108 and the second fertilizer applicator 109 are disposed generally between the closing discs 52 (e.g., between a first closing disc 52 and a second closing disc 52) along the lateral axis 22. The first closing disc 52 and the first fertilizer applicator 108 are disposed on a first lateral side of the furrow 48 and the seed 49, and the second closing disc 52 and the second fertilizer applicator 109 are disposed on a second lateral side of the furrow 48 and the seed 49. The first closing disc 52 and the first fertilizer applicator 108 are separated by a first lateral spacing 120, the first fertilizer applicator 108 and the second fertilizer applicator 109 are separated by a second lateral spacing 122, and the second fertilizer applicator 109 and the second closing disc 52 are separated by a third lateral spacing 124. In certain embodiments, the first lateral spacing 120, the second lateral spacing 122, and the third lateral spacing 124 may be substantially equal to one another. In some embodiments, two spacings of the first lateral spacing 120, the second lateral spacing 122, and the third lateral spacing 124 may be substantially equal to one another. Further, in other embodiments, the first lateral spacing 120, the second lateral spacing 122, and the third lateral spacing 124 may be different from one another. The first closing disc 52, the first fertilizer applicator 108, the second fertilizer applicator 109, and the second closing disc 52 may be disposed at selected spacings/intervals along the lateral axis 22 of the row unit and implement.

Each of the first closing disc 52, the first fertilizer applicator 108, the second fertilizer applicator 109, and the second closing disc 52 may penetrate the soil 32 and serve as an electrode of the soil resistivity detection system. As illustrated, the first and second closing discs 52 are the first soil engaging electrode 100 and the second soil engaging electrode 102, respectively. The first fertilizer applicator 108 and the second fertilizer applicator 109 are the third soil engaging electrode 104 and the fourth soil engaging electrode 106, respectively. As such, the first closing disc 52, the first fertilizer applicator 108, the second fertilizer applicator 109, and the second closing disc 52 may be lateral components serving as electrodes of the soil resistivity detection system 18.

For example, a controller may cause the power source to supply the current to the first pair of lateral components. The first pair of lateral components may include the first and second closing discs 52, the first closing disc 52 and the first fertilizer applicator 108, or another combination of the lateral components (e.g., another combination of the first closing disc 52, the first fertilizer applicator 108, the second fertilizer applicator 109, and the second closing disc 52). The controller may receive the first and second voltages from the second pair of lateral components or from the sensors of the control assembly that may be coupled to the second pair of lateral components. The second pair of lateral components may include the first fertilizer applicator 108 and the second fertilizer applicator 109, the second fertilizer applicator 109 and the second closing disc 52, or another combination of the lateral components. However, the first pair of lateral components do not include components of the second pair of lateral components. Based on the received first and second voltages, the controller may determine a voltage differential. Based on the voltage differential and the respective spacing between the first soil engaging electrode 100 (e.g., the first closing disc 52), the second soil engaging electrode 102 (e.g., the second closing disc 52), the third soil engaging electrode 104 (e.g., the first fertilizer applicator 108), and the fourth soil engaging electrode 106 (e.g., the second fertilizer applicator 109), the controller may determine a resistivity of the soil.

The embodiments of the soil resistivity detection system described herein may determine a soil resistivity and soil properties based on voltages received from the soil. The soil resistivity detection system may utilize portions of an implement row unit that are used for soil working and/or product deposition (e.g., a residue management system having residue disc(s) configured to condition soil at a leading edge of the row unit, an opening system having opening disc(s) and/or a furrow forming point configured to form a furrow in the soil, a closing assembly having closing disc(s) configured to close the furrow, a press wheel assembly configured to compact the soil, fertilizer applicator(s) or a combination thereof). As such, the soil resistivity detection system may utilize functioning components of the row unit as electrodes instead of using/adding non-functional components to the row unit that may serve as electrodes. Thus, the soil resistivity detection system may facilitate determination of various soil properties without significant modification to operable row unit components.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A soil resistivity detection system for an agricultural implement, comprising:

a row unit comprising row unit components, wherein the row unit components consist of:

a residue management system configured to condition soil at a leading edge of the row unit;

an opening system configured to form a furrow in the soil;

a closing assembly configured to close the furrow; and a press wheel assembly configured to compact the soil; and a control assembly comprising a controller having a memory and a processor, wherein the control assembly is configured to:

output an electrical current to a first pair of the row unit components, wherein the first pair of the row unit components are configured to supply the electrical current to the soil;

receive voltages from a second pair of the row unit components, wherein the second pair of the row unit components are configured to receive the voltages from the soil, and the row unit components of the first pair are different from the row unit components of the second pair;

determine a voltage differential based on the voltages; and determine a soil resistivity based on the voltage differential.

2. The soil resistivity detection system of claim 1, wherein the first pair comprises the residue management system and the press wheel assembly, and the second pair comprises the opening system and the closing assembly.

3. The soil resistivity detection system of claim 1, wherein the control assembly comprises a power source, and the controller is configured to output the electrical current to the first pair of the row unit components via the power source.

4. The soil resistivity detection system of claim 2, wherein a press wheel of the press wheel assembly comprises a first electrode configured to supply the electrical current, the residue management system comprises a second electrode configured to supply the electrical current, and the electrical current is configured to flow from the press wheel to the residue management system.

5. The soil resistivity detection system of claim 4, wherein the first electrode comprises a conductive strip disposed between a first insulative portion and a second insulative portion of the press wheel.

6. The soil resistivity detection system of claim 2, wherein the opening system comprises a third electrode configured to receive a first voltage of the voltages, the closing assembly comprises a fourth electrode configured to receive a second voltage of the voltages, and the voltage differential is a difference between the first voltage and the second voltage.

7. The soil resistivity detection system of claim 6, wherein the opening system comprises:

one or more opening discs; and a furrow forming point, a furrow firming point, or a seed shoe, wherein the furrow forming point, the furrow firming point, or the seed shoe comprises the third electrode.

8. The soil resistivity detection system of claim 1, wherein the residue management system, the opening system, the closing assembly, and the press wheel assembly are disposed generally along a longitudinal axis of the row unit.

9. A soil resistivity detection system for an agricultural implement, comprising:
- a row unit comprising lateral row unit components, wherein the lateral row unit components are laterally offset from one another, and the lateral row unit components comprise:
  - a first soil engaging electrode;
  - a second soil engaging electrode;
  - a third soil engaging electrode; and
  - a fourth soil engaging electrode; and
- a control assembly comprising a controller having a memory and a processor, wherein the control assembly is configured to:
  - output an electrical current to a first pair of the lateral row unit components, wherein the first pair of the lateral row unit components are configured to supply the electrical current to soil;
  - receive voltages from a second pair of the lateral row unit components, wherein the second pair of the lateral row unit components are configured to receive the voltages from the soil, and the lateral row unit components of the first pair are different from the lateral row unit components of the second pair;
  - determine a voltage differential based on the voltages; and
  - determine a soil resistivity based on the voltage differential.

10. The soil resistivity detection system of claim 9, wherein the first pair of the lateral row unit components comprises the first soil engaging electrode and the second soil engaging electrode.

11. The soil resistivity detection system of claim 10, wherein the row unit comprises a press wheel, and the press wheel comprises the lateral row unit components.

12. The soil resistivity detection system of claim 10, wherein a first closing disc comprises the first soil engaging electrode, and a second closing disc comprises the second soil engaging electrode.

13. The soil resistivity detection system of claim 9, wherein the second pair of the lateral row unit components comprises the third soil engaging electrode and the fourth soil engaging electrode.

14. The soil resistivity detection system of claim 13, wherein a first fertilizer applicator comprises the third soil engaging electrode, and a second fertilizer applicator comprises the fourth soil engaging electrode.

15. The soil resistivity detection system of claim 9, wherein the first soil engaging electrode, the second soil engaging electrode, the third soil engaging electrode, and the fourth soil engaging electrode are configured to penetrate the soil.

16. The soil resistivity detection system of claim 9, wherein the first soil engaging electrode, the second soil engaging electrode, the third soil engaging electrode, and the fourth soil engaging electrode are laterally spaced generally equally apart from one another at the soil.

17. The soil resistivity detection system of claim 16, wherein each of the first soil engaging electrode, the second soil engaging electrode, the third soil engaging electrode, and the fourth soil engaging electrode are laterally spaced about two inches apart from one another.

18. A soil resistivity detection system for an agricultural implement, comprising:
- a row unit comprising row unit components, wherein the row unit components consist of:
  - a residue management system configured to condition soil at a leading edge of the row unit;
  - an opening system configured to form a furrow in the soil;
  - a closing assembly configured to close the furrow; and
  - a press wheel assembly configured to compact the soil; and
- a control assembly comprising a controller having a memory and a processor, a power source, and a sensor, wherein the control assembly is configured to:
  - output an electrical current via the power source to a first pair of the row unit components, wherein the first pair of the row unit components are configured to supply the electrical current to the soil;
  - receive voltages via the sensor from a second pair of the row unit components, wherein the second pair of the row unit components are configured to receive the voltages from the soil, and the row unit components of the first pair are different from the row unit components of the second pair;
  - determine a voltage differential based on the voltages; and
  - determine a soil resistivity based on the voltage differential.

19. The soil resistivity detection system of claim 18, wherein the first pair of the row unit components comprises the residue management system and the press wheel assembly.

20. The soil resistivity detection system of claim 18, wherein the second pair of the row unit components comprises the opening system and the closing assembly.

* * * * *